(12) United States Patent
    Pierce et al.

(10) Patent No.: US 11,376,498 B2
(45) Date of Patent: Jul. 5, 2022

(54) MANAGING IN-CONTENT CHALLENGES FOR MULTI-PLAYER GAMES

(71) Applicant: Versus LLC, Las Vegas, NV (US)

(72) Inventors: Matthew Dalton Pierce, Culver City, CA (US); Jon Alexander Peachey, Las Vegas, NV (US)

(73) Assignee: Versus LLC, Los Angeles, CA (US)

(*) Notice: Subject to any disclaimer, the term of this patent is extended or adjusted under 35 U.S.C. 154(b) by 113 days.

(21) Appl. No.: 16/687,585

(22) Filed: Nov. 18, 2019

(65) Prior Publication Data

US 2020/0155933 A1    May 21, 2020

Related U.S. Application Data

(60) Provisional application No. 62/769,551, filed on Nov. 19, 2018.

(51) Int. Cl.
    *A63F 13/355*    (2014.01)
    *A63F 13/335*    (2014.01)
    *A63F 13/77*     (2014.01)
    *A63F 13/88*     (2014.01)
    *A63F 13/358*    (2014.01)

(52) U.S. Cl.
    CPC .......... *A63F 13/355* (2014.09); *A63F 13/335* (2014.09); *A63F 13/358* (2014.09); *A63F 13/77* (2014.09); *A63F 13/88* (2014.09); *A63F 2300/552* (2013.01)

(58) Field of Classification Search
    CPC .......................... A63F 13/88; A63F 2300/6036
    See application file for complete search history.

(56) References Cited

U.S. PATENT DOCUMENTS

| | | |
|---|---|---|
| 6,206,782 B1 | 3/2001 | Walker et al. |
| 6,425,828 B2 | 7/2002 | Walker et al. |
| 6,837,793 B2 | 1/2005 | MClintic |
| 8,548,610 B1 | 10/2013 | Howell et al. |
| 8,789,752 B1 | 7/2014 | McGhie et al. |
| 8,827,799 B1 | 9/2014 | Brown et al. |

(Continued)

OTHER PUBLICATIONS

Alphadraft, "AlphaDraft," 2020, 5 pages [Online] [Retrieved Mar. 26, 2020], Retrieved from the internet <URL: https://alphadraft.com/>.

(Continued)

*Primary Examiner* — Tramar Harper
*Assistant Examiner* — Jeffrey K Wong
(74) *Attorney, Agent, or Firm* — Fenwick & West LLP (57) ABSTRACT

An in-content challenge platform and method for generating single user challenges within multiplayer games (and other media) is disclosed. The in-content challenge platform provides various in-content challenges and prize promotions to users for completing specific win conditions within an instance content (e.g., a video game, a fitness application, a streaming video service, etc.). In some embodiments, the platform can be integrated directly into the game itself. In other embodiments, the platform is seen as an overlay to the game. In still other embodiments, the user can interact with the platform through a separate piece of software that is reached via a client device independent of the content or a third-party system providing the content itself.

20 Claims, 7 Drawing Sheets

(56) References Cited

U.S. PATENT DOCUMENTS

| | | | |
|---|---|---|---|
| 8,944,320 B1 | 2/2015 | McGhie et al. | |
| 2005/0261062 A1 | 11/2005 | Lewin et al. | |
| 2007/0167210 A1 | 7/2007 | Kelly et al. | |
| 2009/0048010 A1* | 2/2009 | Kroeckel | G07F 17/3248 463/13 |
| 2009/0069093 A1 | 3/2009 | Kelly et al. | |
| 2009/0115133 A1 | 5/2009 | Kelly et al. | |
| 2011/0117982 A1 | 5/2011 | Nguyen | |
| 2011/0165939 A1* | 7/2011 | Borst | A63F 13/63 463/29 |
| 2012/0150695 A1 | 6/2012 | Fan et al. | |
| 2012/0235357 A1* | 9/2012 | Chambers | A63F 3/00643 273/429 |
| 2013/0079075 A1* | 3/2013 | Osvald | A63F 13/795 463/7 |
| 2013/0109456 A1 | 5/2013 | Wilkinson et al. | |
| 2013/0122999 A1 | 5/2013 | Gagner et al. | |
| 2013/0262188 A1 | 10/2013 | Leibner et al. | |
| 2014/0171182 A1 | 6/2014 | Versaci | |
| 2016/0034936 A1* | 2/2016 | Bryant, III | G06Q 30/0241 705/14.16 |
| 2016/0104352 A1* | 4/2016 | Kehoe | H04L 67/125 463/25 |
| 2016/0136526 A1 | 5/2016 | Mansfield et al. | |
| 2018/0060924 A1* | 3/2018 | Steinwede | H04N 21/44226 |
| 2019/0043378 A1* | 2/2019 | Fishkov | G09B 7/00 |

OTHER PUBLICATIONS

B Spot, "b spot," 2020, 21 pages [Online] [Retrieved Mar. 26, 2020], Retrieved from the internet <URL: https://www.bspot.com/>.

Battlefy, "Battlefy," 2020, 11 pages [Online] [Retrieved Mar. 26, 2020], Retrieved from the internet <URL: https://battlefy.com/>.

Draft Kings, "Draft Kings," 2020, 6 pages [Online] [Retrieved Mar. 26, 2020], Retrieved from the internet <URL: https://www.draftkings.com/>.

Extended European Search Report, European Application No. 15824747.8, dated Nov. 28, 2017, 9 pages.

Fanduel, "FanDuel," 2020, 5 pages [Online] [Retrieved Mar. 26, 2020], Retrieved from the internet <URL: https://www.fanduel.com/>.

Gamblit Gaming, "Gamblit Gaming," 2020, 4 pages [Online] [Retrieved Mar. 26, 2020], Retrieved from the internet <URL: https://gamblitgaming.com/>.

Gamiker, "Gamiker Games," 2020, 3 pages [Online] [Retrieved Mar. 26, 2020], Retrieved from the internet <URL: https://www.gamiker.com/>.

PCT International Search Report and Written Opinion, PCT Application No. PCT/US2015/040060, dated Oct. 1, 2015, 9 pages.

Skillz, "Skillz," 2020, 6 pages [Online] [Retrieved Mar. 26, 2020], Retrieved from the internet <URL: https://www.skillz.com/>.

United States Office Action, U.S. Appl. No. 14/796,966, dated Jan. 20, 2017, 12 pages.

United States Office Action, U.S. Appl. No. 14/796,966, dated May 3, 2018, 9 pages.

United States Office Action, U.S. Appl. No. 14/796,966, dated Sep. 13, 2017, 9 pages.

VG247, "VG24/7," 2020, 6 pages [Online] [Retrieved Mar. 26, 2020], Retrieved from the internet <URL: https://www.vg24.com/>.

WGN, "World Gaming Network," 2020, 3 pages [Online] [Retrieved Mar. 26, 2020], Retrieved from the internet <URL: https://woridgaming.com/>.

Xfire, "XFire," 2020, 13 pages [Online] [Retrieved Mar. 26, 2020], Retrieved from the internet <URL: https://xfire.com/>.

\* cited by examiner

MANAGING IN-CONTENT CHALLENGES FOR MULTI-PLAYER GAMES

CROSS REFERENCE TO RELATED APPLICATIONS

This application claims the benefit of U.S. Provisional Application No. 62/769,551, filed Nov. 19, 2018, which is incorporated by reference in its entirety.

This application is also related to U.S. patent application Ser. No. 15/334,725, filed Oct. 26, 2016, which is a continuation-in-part of U.S. patent application Ser. No. 14/796,966, filed Jul. 10, 2015, which claims priority to U.S. Provisional Patent Application No. 62/027,704, filed Jul. 22, 2014, which is incorporated by reference in its entirety.

BACKGROUND

This disclosure relates generally to gaming and more specifically relates to providing in-content challenges that are provided with content.

Brand owners and sponsors are always seeking pathways to capture consumer attention outside of traditional advertising channels. Audiences are bombarded with advertisements while watching television, listening to music, driving along roads, or browsing the internet, and as a result, audiences have grown accustomed to tuning out these now traditional advertisements. Many people spend hours immersed in interactive media or video games; however, advertising is relatively uncommon in interactive media and video games compared to other traditional media channels. This interactive media includes video games, social media, streaming videos, livestreaming, reading, online shopping, online contests/raffles/lotteries, and other types of easily monitored media activity.

The coding requirements and the inability to easily port potential product placement or fan engagement from one video game title to another creates a significant barrier to entry for brand managers to engage with gamers during the video game experience. Although some large brands have established product placement contracts with video game developers, these agreements are not a well-matched solution for brand promotion in video games. These sorts of 1-to-1 promotion contracts require long lead times, significant negotiation and coding, and can result in static, repetitive, billboard-like promotions placed in a game. As some video gamers spend tens and hundreds of hours playing through the same maps, these advertisements may be tuned out by the same traditional advertisement filters. Additionally, these advertisements are not easily inserted into different games or targeted to specific audiences.

SUMMARY

An in-content challenge platform and method for generating single user challenges within multiplayer games (and other media) is disclosed. The in-content challenge platform provides a client application of the in-content challenge platform to a user for installation on a client device. The client application allows the user to access in-content challenges provided by the in-content challenge platform. In other embodiments, the client application may be incorporated into a gaming consul, computing device, or other gaming platform. Each in-content challenge is provided by the in-content challenge platform in connection with an instance of content (e.g., a fitness application, a video, a movie, an episode of a show, a live sporting event, a season of a show, a video game match, or a video game level, etc.) provided by a third-party content provider computing system (e.g., a game developer, a media service provider, an application developer, video production company, or an individual user). In one embodiment, upon detecting that the user has initiated a session of consume an instance of content (e.g., watch a show via a streaming video service, play a video game, etc.), the client application provides the in-content challenge platform with an indication that the user initiated the session along with a content type associated with the instance of content and other information of the instance of content, such as the title, system/gaming platform/application associated with the instance of content, and so forth. In response, the in-content challenge platform determines a set of available in-content challenges that are associated with the instance of content based on the content type of the instance of content and characteristics of the user matching in-content challenge criteria associated with each in-content challenge. Each in-content challenge is a personal challenge of individual achievement that the user may undertake while viewing, listening, playing, or otherwise engaging the instance of content.

Accordingly, the in-content challenge platform provides the available in-content challenges for display to the user on the client device. In response to receiving a selection from the user to an available in-contest challenge, in-content challenge platform initiates the in-content challenge. The in-content challenge includes a prize and a win condition to win the prize by engagement of the user with the instance of content.

As the user consumes the content (e.g., viewing, listening, playing, etc.) while participating in the in-content challenge, the in-content challenge platform receives in-content engagement statistics from the third-party content provider computing system. In one embodiment, in-content engagement statistics are received via an application programming interface (API) provided by the third-party system. This allows the in-content challenge platform to track the progress of the user toward and to confirm the win condition. In response to determining that the user at least meets the win condition based on the received in-content engagement statistics from the third-party content provider computing system, the in-content challenge platform provides the user with the prize associated with the win condition.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An in-content challenge platform and method for generating single user challenges within multiplayer games (and other media) is disclosed. The in-content challenge platform provides various in-content challenges and prize promotions to users for completing specific win conditions within an instance content (e.g., a video game, a fitness application, a streaming video service, etc.). In some embodiments, the platform can be integrated directly into the game itself. In other embodiments, a dashboard and other features of the platform can be observed by a user as an overlay to content, such as in a content menu and/or during content engagement (e.g., playing a game, viewing a show or live event, tracking steps in a fitness app, etc.). In still other embodiments, the user can interact with the platform through a separate piece of software that is reached via a client device independent of the content or a third-party system providing the content itself.

The platform may aggregate and present all available in-content challenges (e.g., video games, contests, content options, prize challenges, etc.) available to the user in a single convenient location. The platform includes a dashboard and menus that include challenge options and/or game launcher functionality to streamline challenge entry and participation for users. Accordingly, the in-content challenge platform provides the available in-content challenges for display to the user on the client device. In response to receiving a selection from the user to an available in-contest challenge, in-content challenge platform initiates the in-content challenge. The in-content challenge includes a prize and a win condition to win the prize by engagement of the user with the instance of content. As used herein, an instance of content is an item of interactive media including that includes any type of interactive experience engaged by a user. Thus, an instance of content includes a video game or any type of game or tournament, streaming music, streaming video, an article, a webpage, an e-book, fitness tracking application, livestreaming event, or any other type of monitored media activity.

As the user is consuming the content (e.g., viewing, listening, playing, etc.) and participating in the in-content challenge, the in-content challenge platform receives in-content engagement statistics from the third-party content provider computing system providing the instance of content via an application programming interface (API) provided by the third-party system. This allows the in-content challenge platform to track the progress of the user toward and to confirm the win condition. In response to determining that the user at least meets the win condition based on the received in-content engagement statistics from the third-party content provider computing system, the in-content challenge platform provides the user with the prize associated with the win condition.

Achieving a win condition may only require a task that can be monitored outside the instance of content itself, such as logging into an instance of content from the same device every day for a number of days, or by logged into the third-party system providing the instance of content or other content for a certain number of hours. Such an embodiment would allow the platform to offer prizes for certain actions even if certain individual pieces of content were not fully integrated into the platform. As such, this type of features and functionality would be especially effective within content platforms that host other individual pieces of content that may or may not be owned and operated by third parties. For example, a platform with this functionality/capability if integrated into a streaming video service (e.g., Netflix, Hulu, etc.), would allow the streaming video service to offer prizes for watching ten hours of movies from a particular video production company (e.g., Warner Brothers, etc.) whether or not the platform is integrated into each of those movies individually. This incarnation of the in-content challenge platform would also work for platforms that host interactive content. For example, portals where users can log in, purchase games, and even launch those games through an interface, could integrate the in-content challenge platform based on participation (number of days played, games purchased, etc.) without each of the individual games on that portal being directly integrated into the in-content challenge platform.

System Architecture

Figure 1:
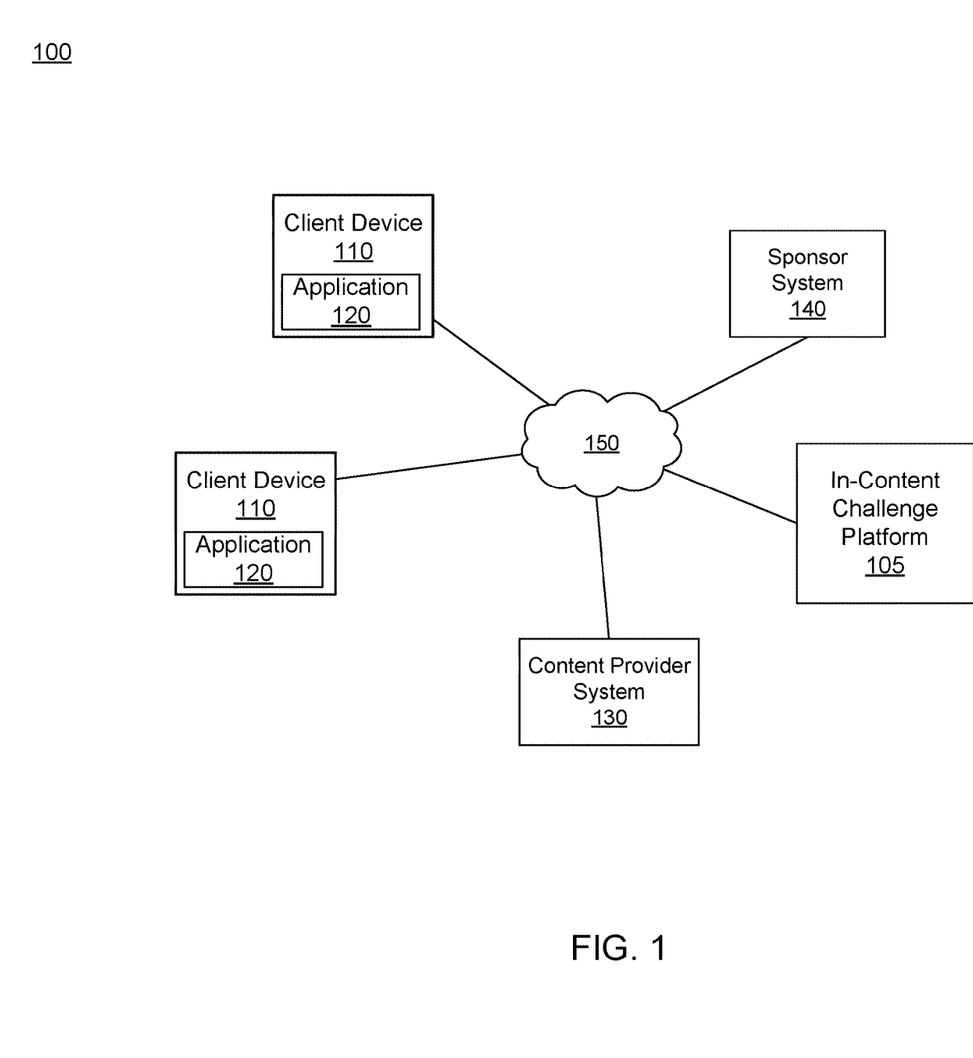
FIG. 1 is a block diagram of a system environment in which an in-content challenge platform operates, in accordance with an embodiment.

FIG. 1 is a block diagram of a system environment 100 for an in-content challenge platform 105. The system environment 100 shown by FIG. 1 comprises in-content challenge platform 105, one or more client devices 110, one or more third-party systems 130, one or more sponsor systems 140, and a network 150. In alternative configurations, different and/or additional components may be included in the system environment 100.

The client devices 110 are one or more client computing devices capable of receiving user input as well as transmitting and/or receiving data via the network 150. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 150. In one embodiment, a client device 110 executes an application allowing a user of the client device 110 to interact with the in-content challenge platform 105. For example, a client device 110 executes a browser application to enable interaction between the client device 110 and the in-content challenge platform 105 via the network 150. In another embodiment, a client device 110 interacts with the in-content challenge platform 105 through an application programming interface (API) running on a native operating system of the client device 110, such as IOS® or ANDROID™. In another embodiment, a client device 110 interacts with the in-content challenge platform 105 through a client application 120 provided by the in-content challenge platform 105.

The client devices 110 are configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

One or more third-party content provider computing system 130 (e.g., a game developer, a media service provider, an application developer, video production company, an individual user content provider, etc.) may be coupled to the network 150 for communicating with the in-content challenge platform 105. In one embodiment, a third-party content provider computing system 130 is a content provider communicating content for consumption on a client device 110 or communicating data to client devices 110 or the in-content challenge platform 105 for use by an application executing on the client device 110. In other embodiments, third-party content provider computing system 130 provides content or other information for presentation via a client device 110. A third-party content provider computing system 130 may also communicate information to the in-content challenge platform 105, such as advertisements, content, or information about an application provided by the third-party content provider computing system 130.

One or more sponsor systems 140 may be coupled to the network 150 for communicating with the in-content challenge platform 105. The sponsor systems 140 communicate in-content challenge criteria to the in-content challenge platform 105 to generate in-content challenges within the in-content challenge platform 105, which is further described below in conjunction with FIG. 2.

In-Content Challenge Platform

Figure 2:
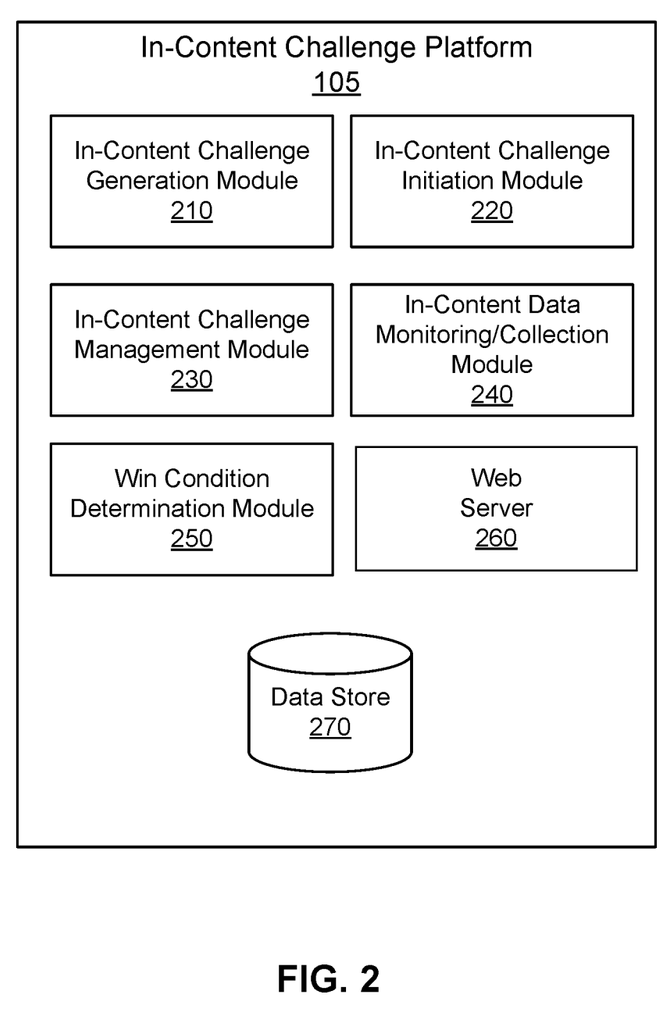
FIG. 2 is a block diagram of an in-content challenge platform, in accordance with an embodiment.

FIG. 2 is a block diagram of an architecture of an in-content challenge platform 105. The in-content challenge platform 105 shown in FIG. 2 includes an in-content challenge generation module 210, an in-content challenge initiation module 220, an in-content challenge management module 230, an in-content challenge data monitoring/collection module 240, a win condition determination module 250, a web server 260, and a data store 270. In other embodiments, the in-content challenge platform 105 may include additional, fewer, or different components for various applications. Conventional components such as network interfaces, security functions, load balancers, failover servers, management and network operations consoles, and the like are not shown so as to not obscure the details of the system architecture.

The in-content challenge generation module 210 receives in-content challenge criteria from sponsor systems 140 and/or other content creator systems to generate the in-content challenges within the in-content challenge platform 105. In one embodiment, the in-content challenges are targeted brand promotion provided to users for the completion of a specific task within an instance of content. For example, a restaurant may establish an in-game challenge for a football video game (e.g., x number of touchdowns, etc.) to win a coupon for 50% off their meal during Monday Night Football. Thus, the challenge criteria may include a content type (e.g., video game, movie, show, fitness application, etc.) a content title (e.g., video game or movie title), a prize, a win condition for winning the prize, user targeting characteristics (e.g., age, location, interests, etc.) and other relevant or more specific information depending on the scope of the challenge being defined by the sponsor. In the football game example, the content type is a video game, the title might be Madden 29, the prize is a 50% off food coupon at the restaurant during Monday Night Football, the win condition is x number of touchdowns during the game, and the sponsor may additionally define user targeting characteristics that the user be over 21 years of age, live within a set of zip codes (e.g., that are close to the restaurant) while using a particular gaming system (e.g., only Xbox One and PlayStation). Accordingly, with the challenge criteria, the in-content challenge generation module 210 generates the in-content challenges. This allows brand managers of sponsor systems 140 to easily generate promotions offering a specific prize to targeted participants for completion of the specific criteria within the interactive media.

The in-content challenge initiation module 220 receives an indication that a user initiated a session to consume an instance of content. In one embodiment, the in-content challenge initiation module 220, via client application 120, tracks and analyzes local client device 110 operations to determine video game or other content operations. For example, the in-content challenge initiation module 220 may analyze memory usage, CPU usage, content "launcher" usage, software initiation logs or other comparable logs in the Operating System, internet transmissions, hard drive operations, or any other system metrics for recognized evidence that a certain game or other piece of software is being played/viewed/used. Tracking such processes allows in-content challenge initiation module 220 to recognize specific software or system events that indicate that a user is about to play a game on their game console or has launched a video streaming service application on their television or tablet computer. In one embodiment, in-content challenge initiation module 220 recognizes and identifies transmissions to specific IP addresses, servers, or other remote access methods as relating to specific entities. Accordingly, in response to receiving such an indication, in-content challenge initiation module 220 launches the in-content challenge platform 105 on behalf of the user.

The in-content challenge management module 230 determines available in-content challenges in response to receiving the indication that the user initiated a session to consume an instance of content. The in-content challenge management module 230 determines the available in-content challenges based on the content type of the instance of content and characteristics of the user matching in-content challenge criteria associated with each in-content challenge. The in-content challenge management module 230 then provides the available in-content challenges for display to the user on the user's client device and awaits a selection. In one embodiment, the in-content challenge management module 230 also determines what prizes are available for each in-content challenge. For example, two users playing the same in-content challenge, but located in different states or countries, may not be able to qualify for the same prizes because of local availability. Moreover, two different users may play the same in-content challenge, but qualify for different prizes based on their age or other user characteristics. Responsive to receiving a selection from the user to an available in-contest challenge, the in-content challenge management module 230 initiates the in-content challenge to allow the user to consume the instance of content while also attempting to win the prize associated with the in-content challenge.

In one embodiment, the in-content challenge management module 230 also provides the user with a client application of the in-content challenge platform 105 for installation on the client device of the user that facilitates communication and challenge services to the user. Thus, the client application allows the user to access the in-content challenges.

The in-content challenge data monitoring/collection module 240 receives in-content engagement statistics from the third-party content provider computing system 130 that provides the instance of content via an application programming interface (API) provided by the third-party system. However, in-content challenge data monitoring/collection module 240 can be configured to consolidate results and performance from the third-party content provider computing system 130 in a number of ways: 1) incorporate platform data sharing directly into the content, 2) code the platform to analyze and draw game/content statistics directly through a network based API provided by the third-party content provider computing system 130 (e.g., video game developer, content creator, etc.) for community game interaction and customization, and 3) analyze client device 100 operations to determine video game operation. In some embodiments, in-content challenge data monitoring/collection module 240 retrieves in-content statistics locally stored on a user's client device. Accordingly, in-content challenge data monitoring/collection module 240 may directly retrieve game statistics from locally stored game data and transmit that information to the platform 200 servers for incorporation, verification, prize qualification, or analysis.

In one embodiment, the in-content challenge data monitoring/collection module 240 receives event data from the third-party content provider computing system 130 when relevant, flagged, or predetermined actions are performed by the user within the game or other content provided by the third-party content provider computing system 130. The in-content challenge platform 105 uses the event data to apply progress against active challenges with win conditions based on the events matched on event name. In one embodiment, the event data is structured in the JavaScript Object Notation (JSON) format. The event data contains a name for the event can match the name of a win condition rule, at least one timestamp indicating at least the start and additionally maybe the finish of the event, the delta between the timestamps is the duration of the event (which may be zero for instant type events, such as enemy kills), the event durations from events of the same name may be combined to reach totals required by win condition rules of a matching name, and a value for the event. The event data contains an integer value. Values from events of the same name may be combined to reach totals required by win condition rules of a matching name. Events performed by the user within the third-party content provider computing system 130 may generate more than one event. In one embodiment, multiple events with names of varying levels of granularity may be triggered. For example, if the user was to kill a boss tier enemy named "Gurgan the Demon Prince" in a game, the third-party content provider computing system 130 might trigger the following events:

Name: "KILL_ENEMY", Value: 1

Name: "KILL_BOSS", Value: 1

Name: "KILL_DEMON", Value: 1

Name: "KILL_GURGAN", Value: 1

Name: "INFLICT_DAMAGE", Value: 25,000

In another example, if the user was to watch an episode of the comedy "The Office" on a video streaming service, the third-party content provider computing system 130 might trigger the events:

Name: "WATCH_SHOW", Value: 1

Name: "WATCH_COMEDY", Value: 1

Name: "WATCH_THE_OFFICE", Value: 1

Name: "WATCH_THE_OFFICE_SEASON_1_EPISODE_5", Value: 1

Thus, in one embodiment, the third-party content provider computing system 130 generates custom events for the in-content challenge platform 105. The third-party content provider computing system 130 may remain agnostic to specific challenges provided by the in-content challenge platform 105 during an integration process where the events and in-content challenges between the in-content challenge platform 105 and the third-party content provider computing system 130 are established. Thus, win conditions may be defined using any of the possible event names the third-party content provider computing system 130 is capable of generating at a later time. In this way, challenges of varying difficulty can be created by adjusting the target values, target durations, and specificity of the events. For example, a low difficulty challenge could be created based on the event "KILL_ENEMY" with a target value of 5. Any combination of "KILL_ENEMY" events with values summing to 5 or more would satisfy this win condition. For example a high difficult challenge could be created based on the event "KILL_GURGAN" with a target value of 1. Only an event indicating the user had killed the specific boss (e.g., a Gurgan) would generate a win for this challenge.

Multiple challenges can concurrently be active for a user. Events received by the in-content challenge data monitoring/collection module 240 are applied to any and all active challenges where the win condition rules match the names on the received events. The progress is updated on each challenge based on the win condition rule targets and the accumulated values and durations from the relevant events.

In other embodiments, the third-party content provider computing system 130 remotely stores in-content statistics relevant to potential challenge win conditions on publicly accessible servers. This allows the in-content challenge data monitoring/collection module 240 to directly retrieve remotely stored in-content statistics from remote API servers, and incorporate, verify, prize qualify, or analyze the information before, after, or at the same time as transmitting this information to the user's local platform 200 dashboard. Similar to direct game integration via an API, remotely stored in-content data retrieval by the platform 200 minimizes the risk of local manipulation of the in-content challenge results (e.g., users falsifying their in-content statistics to fraudulently win prizes). This additional layer of reliability may be important or even necessary to verify results for challenges including some high-value or high-prestige challenges that may require a participant to complete difficult, or time-consuming win conditions.

In another embodiment, the in-content challenge data monitoring/collection module 240 receives data via one or more APIs of the third-party content provider computing system 130 to generate events based on user actions within the content. For example, using an API of the third-party content provider computing system 130, game matches that a user has played can be determined. Then, with the game match data, specific event data around what happened in each match that fits a time window for one or more challenges created by the in-content challenge platform 105 can be determined. For example, if the in-content challenge platform 105 determines that in a match the user's team won the match, the system generates a "MATCH_WON" event. If the in-content challenge platform 105 determines that the user made 3 champion kills, the in-content challenge platform 105 generates an event "CHAMPION_KILL", with a value of 3. All of this is based on the results of the match provided by the API.

The in-content challenge data monitoring/collection module 240 may also analyze local client device operations to determine video game or other content operation. The in-content challenge data monitoring/collection module 240 may analyze memory usage, CPU usage, content "launcher" usage, software initiation logs or other comparable logs in the Operating System, internet transmissions, hard drive operations, or any other system metrics for recognized evidence that a certain game or other piece of software is being played/viewed/used. In some cases, such processes would allow the in-content challenge data monitoring/collection module 240 to recognize specific in-game data or in-software events. In one embodiment, the in-content challenge data monitoring/collection module 240 is programmed to recognize and identify transmissions to specific IP addresses, servers, or other remote access methods as relating to specific gameplay (e.g., multiplayer match-making). In another embodiment, the in-content challenge data monitoring/collection module 240 is be programmed to recognize that a user has entered a specific level when the video game accesses or updates a locally stored file containing level-specific game resources. Further, the platform 200 will take steps to secure, anonymize, or pseudonymize individual user/participant and other personal data at all relevant points throughout the process as needed for legal and regulatory compliance.

The win condition determination module 250 monitors the user's progress toward the win condition for the challenge to determine if and when the user at least meets the win condition based on the received in-content engagement statistics from the third-party content provider computing system 130. In one embodiment, a win condition, also known as a victory condition, may be the game state that must be reached to establish the order of finish in a particular challenge, game, or tournament. Win conditions may relate to specific achievements within the game, such as competing Level 2, defeating 250 of a specific type of enemy, timed runs, certain point totals, collection of certain items, or other achievements. Accordingly, in response to the user at least meeting the win condition, the win condition determination module 250 providing the user with the prize associated with the win condition.

The web server 260 links the in-content challenge platform 105 via the network 150 to the one or more client devices 110, as well as to the one or more third-party content provider computing systems 130 and one or more sponsor systems 140, as described with respect to FIG. 1. The web server 260 serves web pages, as well as other content, such as JAVA®, FLASH®, XML and so forth. Additionally, the web server 260 may provide application programming interface (API) functionality to send data directly to native client device operating systems, such as IOS®, ANDROID™, or BlackberryOS.

The data store 270 may be used to store various types of in-content related information. The data store 270 may store user data and user characteristics, in-content challenge data including in-content challenge criteria, content data from the one or more third-party content provider computing systems 130, and so forth. The data may be stored so that users, developers, operators, facilitators, third party affiliates, or system administrators can have access to that user's game history for analytics purposes, data mining, fraud-prevention services, and so forth.

In-Content Challenge User Interfaces

In one embodiment, when a user accesses the in-content challenge platform 105, the user is presented with a dashboard that includes the user's in-content challenge options in a single convenient list. From a home dashboard screen, users can select a list of available video game streams to watch (including tutorials), a list of available video games, a list of available prizes (challenge payouts), and a link to manage or edit user information (e.g., name, address, e-mail address, payout preference, age, payment methods, public/private visibility) under the payer profile. In other embodiments, content creators and/or contest facilitators using the dashboards may have the ability to offer an in-game visualization of the prize itself during gameplay. In such an instance, the prize may be visible to the user during gameplay once the prize/challenge is selected by the user. This could mean anything from an icon or representation of the prize in a corner of the screen reminding participants what they are playing for, to a separate "progress bar" that updates in real time during gameplay to show participants how close they are to achieving the prize (in some cases this will be independent of how close the participant is to completing the content or completing other in-game achievements).

This in-game visibility may increase a participant's willingness to continue to play/watch/participate by reminding them of the stakes and by keeping them appraised of their in-challenge status. Content creators and/or contest facilitators may want to offer this functionality to certain prize providers (including in those instances where they themselves are the prize provider) to drive additional engagement. Prize providers may want to take advantage of this functionality to increase brand or prize awareness, or to make their prizes more "aspirational" as participants seek to achieve/earn the particular prize. In some embodiments, the dashboards of the system may allow content creators and/or contest facilitators to offer this increased in-game visibility to certain, or all, prizes based on any number of reasons. In some embodiments, analytics would also be provided to content creators and/or contest facilitators tracking how many times the users saw a given prize, what they chose, what they did not choose, and then, in some cases, how long the prize appeared in their heads-up-display (HUD)/the duration of the prize's appearance in each session.

Figure 3A:
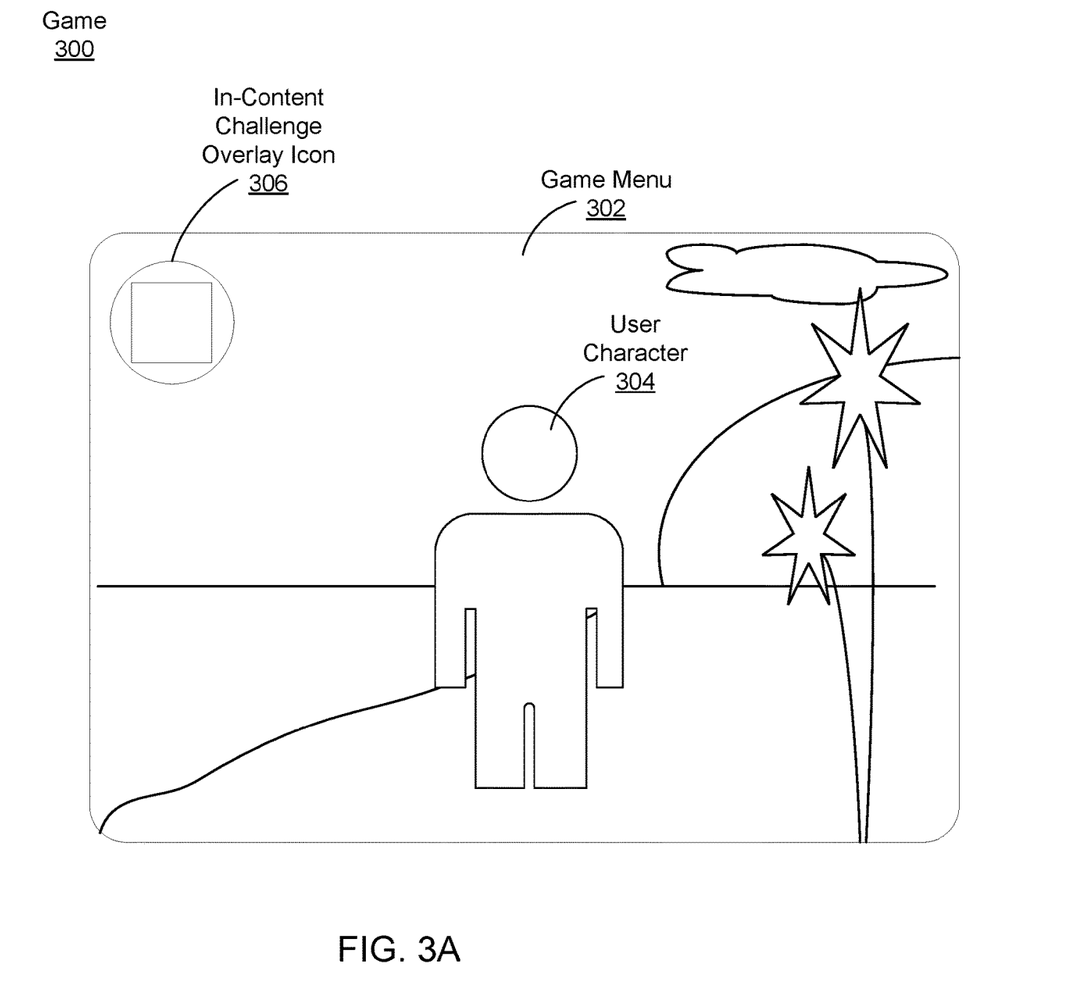
FIG. 3A is an illustration of a game menu of a game provided by a third-party system that includes an in-content challenge overlay icon, in accordance with an embodiment.

In other embodiments, users can access in-game challenges via client application 120 without accessing the dashboard. FIG. 3A is an illustration of a game menu 302 of a game 300 provided by a third-party content provider computing system 130, in accordance with one embodiment. In this embodiment, a user logs into a video game system to play the game 300. In response to the video game system being powered on, the in-content challenge platform 105 receives a signal that the user is about to play a game and provides an in-content challenge overlay icon 306 for display to the user. In this example, the user is in a game menu 302 or a game lobby to choose their user character 304 and other game options and the in-content challenge platform 105 via the client application 120 provides the overlay icon 306 for display to the user to allow the user to select an in-game challenge for the game 300. Accordingly, in response to receiving a user selection from the user to the overlay icon 306, the in-content challenge platform 105 determines a list of in-content challenges and prizes available for the user based on the game 300 and the user's characteristics.

Figure 3B:
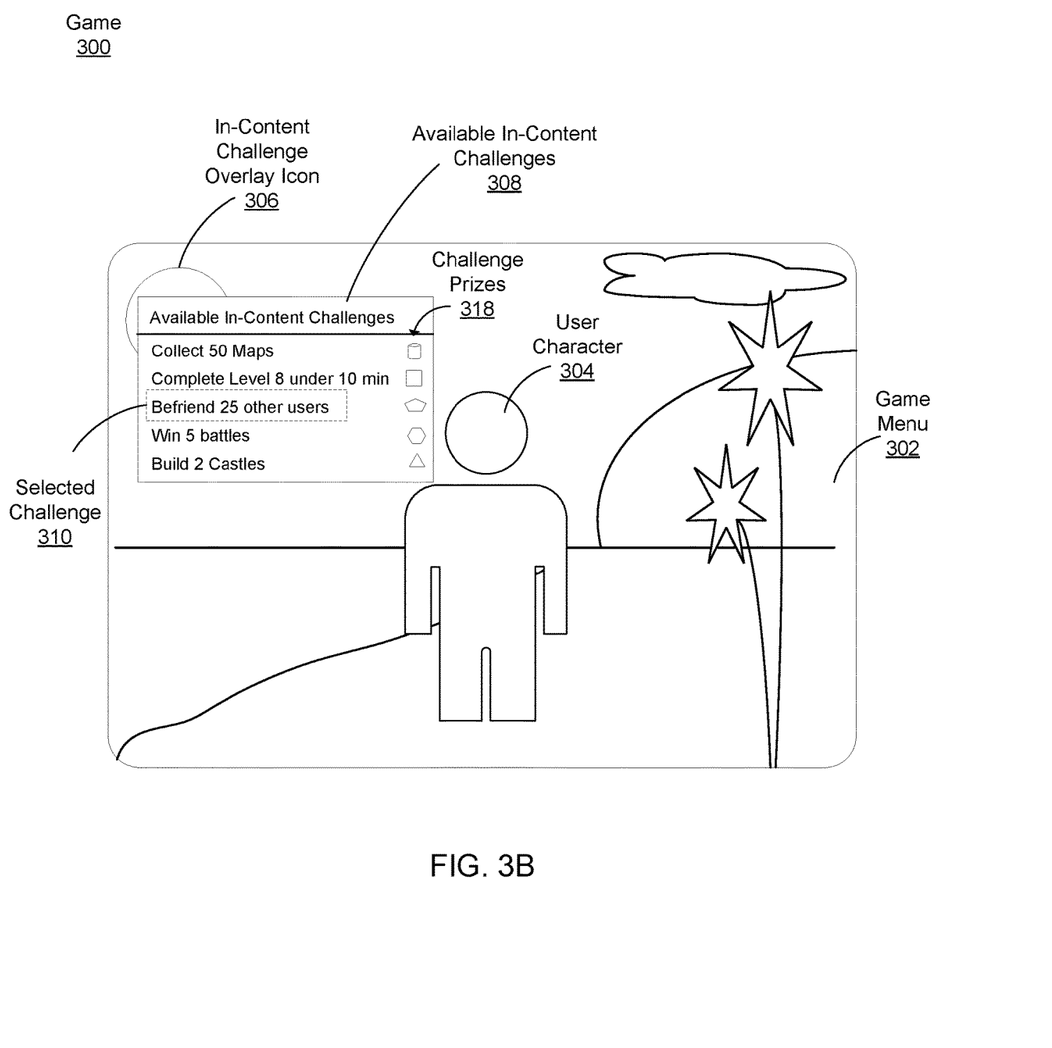
FIG. 3B is an illustration of a drop-down menu of the in-content challenge overlay icon of FIG. 3A that shows available in-content challenges for the game, in accordance with an embodiment.

FIG. 3B is an illustration of a drop-down menu of available in-content challenges 308 that is displayed in response to receiving the user selection to the in-content challenge overlay icon 306, in accordance with an embodiment. In this example, the available in-content challenges 308 are also provided in an overlay layer over the game menu 302 and include a challenge description and a challenge prize 318 for each in-content challenge. Accordingly, the user selects a selected challenge 310 from the list of available in-content challenges 308 and proceeds to play the game 300. In this example, the user selected a challenge to "Befriend 25 other users" within the game. In other examples, the challenge could have been to kill x number of enemies in a first-person shooter, obtain a particular point total in another game, or build a particular monument in Minecraft, and so forth.

Figure 3C:
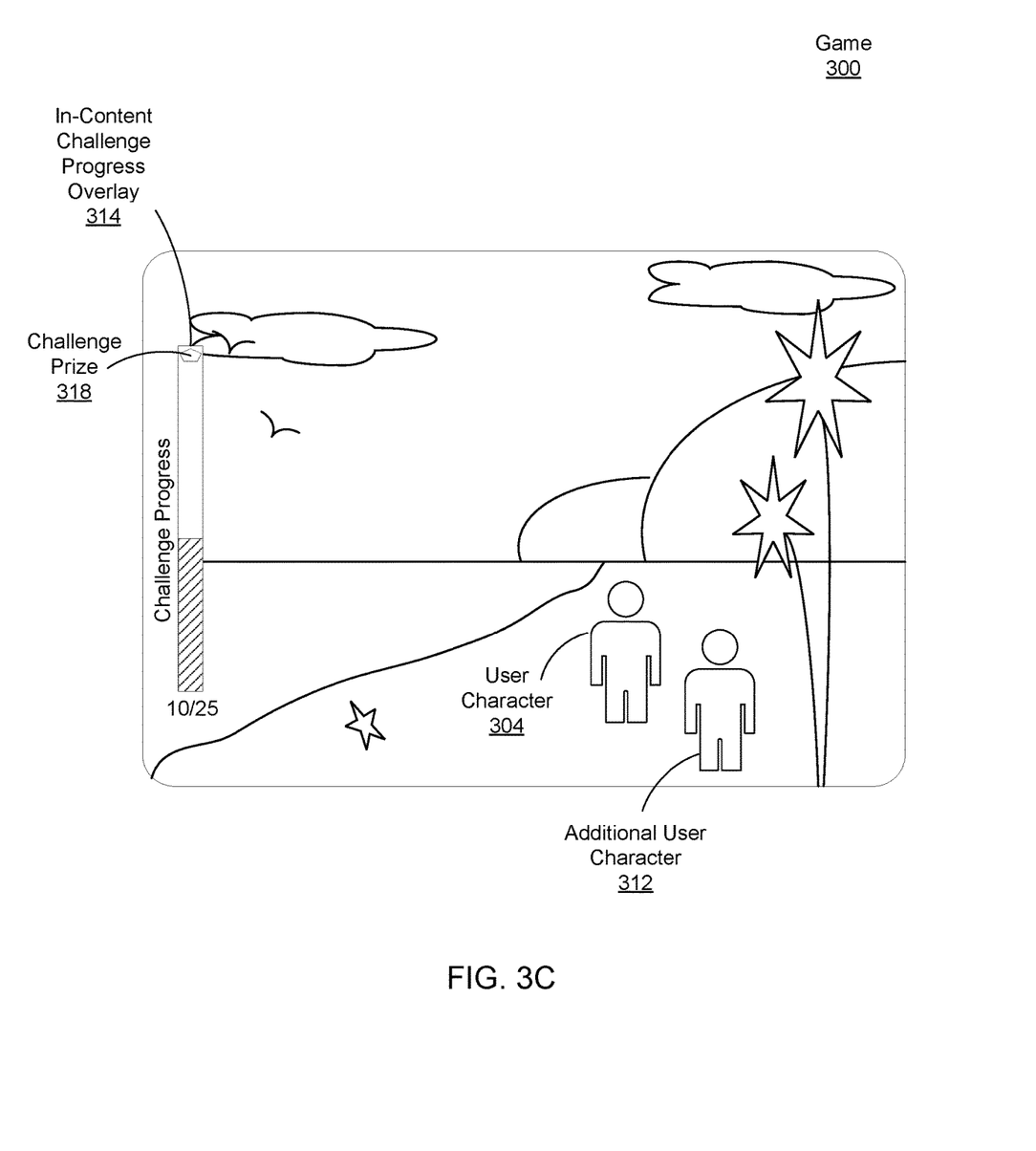
FIG. 3C is an illustration of a scene from the game of FIGS. 3A-3B that shows the user's progress toward their selected in-content challenge, in accordance with an embodiment.

FIG. 3C is an illustration of a scene from the game 300 that shows the user's progress toward their selected in-content challenge 310, in accordance with an embodiment. In this example, the user character 304 is shown in the game 300 adjacent an additional user character 312 to denote that the user has befriended this additional user character 312 within the game 300 and, therefore, has made progress toward the selected in-content challenge 310. The user's progress toward the goal of the selected in-content challenge 310 is provided visually to the user as in-content challenge progress overlay 314 that is provided over game 300. In this example, in-content challenge progress overlay 314 includes a representation of the challenge prize 318 and the user's current challenge status (i.e., the user has befriended 10 of the challenge's 25 other users).

Single Player-ification of Multiplayer Games

Various embodiments of the in-content challenge platform 105 work for both true single player and multiplayer games. In certain instances, grouping together single player games into common leaderboards, tournaments, and other types of asynchronous competitions, is a method by which to create "pseudo multiplayer" competitions. This disclosure seeks to further describe methods that this system employs to create single-player challenges out of multiplayer competitions. Reasons for doing this are varied—including legal and regulatory issues that arise from the varied participants in a multiplayer match. For example, not all participants in a given online game will be eligible for the same prizes, or will have the same prizes be relevant or desirable for them to win. In a hypothetical team in a hypothetical 5-on-5 game, there may be some team members who are under 18, some who are in different countries, and some who, for whatever reason, do not want, or cannot accept certain prizes. In most tournament systems such an arrangement would not only invalidate the team from participating for prizes, but in certain instances, could invalidate an entire tournament—making a tournament facilitator liable for damages for allowing ineligible or underage players to participate. Accordingly, the in-content challenge platform 105 creates "pseudo-single-player" challenges by isolating those eligible players who opt-into participation an opportunity to play for prizes on the in-content challenge platform 105 regardless of whether their teammates or competitors are playing for the same prize (or even whether their teammates or competitors are registered with the system, or whether they are even eligible).

Rather than requiring the in-content challenge platform 105 to determine each participant's eligibility and then move forward with the contest once all players/participants are eligible, the in-content challenge platform 105 will only evaluate those participants who opt-into the contest, regardless of whether or not the achievement of their chosen win condition is entirely and wholly reliant on their own individual performance. For example, in the hypothetical 5-on-5 game described above, the in-content challenge platform 105 enables any combination of the ten individuals to compete for a prize. It also enables any two or more of those ten individuals to compete for different prizes. In such an instance, player one (of ten) may choose either a win condition that they can achieve on their own (number of individual baskets or rebounds in a basketball game, for example), or a team-oriented win condition (the team wins the match), or a win condition that is outside of the game (did player one play every day for a week), or a win condition that is wholly reliant on either chance or the performance of a third party or parties (did the tournament facilitator enter all participants into a sweepstakes or drawing for that week). In fact, a single player, through the use of the in-content challenge platform 105, could be participating in any or all of the win conditions described above simultaneously.

Generating In-Content Challenges

Figure 4:
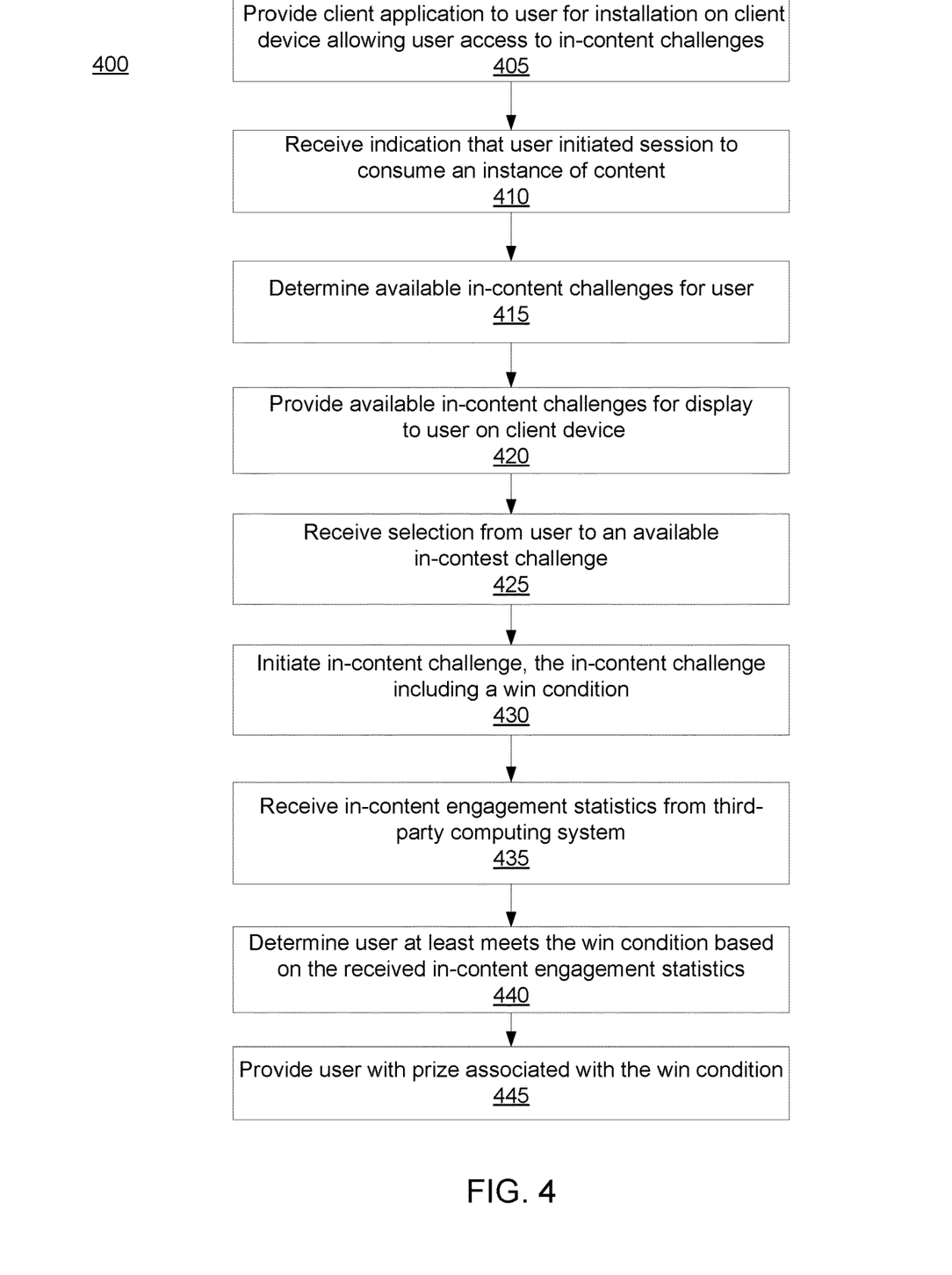
FIG. 4 is a flowchart for generating an in-content challenge within an instance of content, in accordance with an embodiment.

FIG. 4 is a flowchart for generating an in-content challenge within an instance of content, in accordance with an embodiment. Other entities may perform some or all of the steps of the process in other embodiments. Likewise, embodiments may include different and/or additional steps, or perform the steps in different orders.

The in-content challenge platform 105 provides 405 the user with a client application 120 of the in-content challenge platform 105 for installation on the client device 110 of the user that facilitates communication and challenge services to the user. The user is a registered user of the in-content challenge platform 105 with a user profile at the in-content challenge platform that stores user characteristics of the user (e.g., age, location, game history, game preferences, in-content challenge history, other content viewing history, etc.). Additionally, in-content challenge platform 105 may provide the client application 120 responsive to the receiving a registration request from the user to register with the in-content challenge platform 105. Thus, upon the user filling out an online form to receive the user's information and characteristics, the in-content challenge platform 105 provides 405 the user with a client application 120 of the in-content challenge platform 105 for installation.

The in-content challenge platform 105 receives 410 an indication that a user initiated a session to consume an instance of content. As described above, the in-content challenge platform 105, via client application 120, tracks and analyzes local client device 110 operations to determine video game or other content operations, such as by analyze memory usage, CPU usage, content "launcher" usage, software initiation logs or other comparable logs in the Operating System, internet transmissions, hard drive operations, or any other system metrics for recognized evidence that a certain game or other piece of software is being played/viewed/used.

The in-content challenge platform 105 determines 415 available in-content challenges in response to receiving the indication that the user initiated a session to consume an instance of content. The available in-content challenges are determined based on the content type of the instance of content and characteristics of the user matching in-content challenge criteria associated with each in-content challenge. The available in-content challenges are then provided for display to the user on the user's client device for selection. In one embodiment, the prize is also determined for each of the available in-content challenges based on the user characteristics of the user. For example, two users playing the same in-content challenge, but located in different states or countries, may not be able to qualify for the same prizes because of local availability. Moreover, two different users may play the same in-content challenge, but qualify for different prizes based on their age, location or other user characteristics. Thus, a first user playing the same online game and participating in the same in-content challenge as a second user can be shown different prizes. In one embodiment, the first and second users play the same online game over the network with other users who are not registered users of the in-content challenge platform 105.

The in-content challenge platform 105 then provides 420 the available in-content challenges for display to the user in an overlay menu on the client device 110 over the instance of content. Responsive to receiving a selection from the user to an available in-contest challenge, the in-content challenge platform 105 initiates 430 the in-content challenge to allow the user to consume the instance of content while also attempting to win the prize associated with the in-content challenge.

The in-content challenge platform 105 receives in-content engagement statistics from the third-party content provider computing system 130. In one embodiment, the in-content engagement statistics are received via an API provided by the third-party system content provider computing system 130 and are received in real-time as the user engages the content. For example, if the user is playing a first-person shooter game, the in-content engagement statistics may include how long the user stays alive, how many enemy kills they register, if their team wins, and so forth. Accordingly, these statistics are received by the in-content challenge platform 105 in real-time to, in one embodiment, allow the user to visually observe their in-content challenge progress.

In response to determining 440 that the user at least meets the win condition based on the received in-content engagement statistics from the third-party content provider computing system 130, the in-content challenge platform 105 provides the user with the prize associated with the win condition.

Other In-Content Challenge Considerations and Benefits

By providing a single, central content aggregator system integrating a number of video games and interactive media activities, the in-content challenge platform 105 is uniquely positioned to engage audiences. The in-content challenge platform 105 may aggregate data across multiple devices, such as a mobile device, a video game console, a fitness tracking wearable, a smart television, a digital assistant, smart home devices, and a traditional computer. include cross-promotional challenges, such as:

A challenge to play at least two different video games by the same or different developers or publishers.

A challenge to stream a movie and playing a video game or mobile video game associated with the movie.

A challenge to play a console-based video game and the mobile device video game relating to the same IP (e.g., Star Wars, Avengers, Harry Potter, Fortnite, Diablo, etc.)

A challenge to play a sports game and also achieve specific fitness tracking activities (e.g., physical activity for at least 60 minutes).

A challenge to read at least 10 pages or 10 minutes in an e-book before playing any video game or opening any social media.

A challenge to play a specific video game and to like a specific social media post promoting the game.

A challenge to turn off IOT bedroom lights before 8:30 PM every night and to perform at least 30 minutes of physical activity before 6:30 AM every morning for a week.

Additionally, the cross-promotional challenges may reward prizes or payouts in-game or in-media for one of the aggregated devices or games. For example, a combination of playing a soccer video game, streaming a soccer tutorial, and fitness tracking participating in at least one real-life soccer game may offer a boost to custom characters in the soccer video game and also enable a new game-related screensaver or display background for the fitness tracker. In other embodiments, the cross-promotion challenges may introduce players to other related opportunities. For example, a challenge including reading a Spider-Man digital comic book, playing a Spider-Man video game, and checking in on social media for watching the Venom movie may award a prize/payout of a limited-edition Spider-Man collectible figurine or a discount on Spider-Man toys.

The in-content challenge platform 105 provides benefits to various entities including user/players, sponsors/advertisers, and content providers/video game developers. For example, occasionally, servers need to undergo maintenance, updates, or repairs and sometimes that requires third-party content provider systems to momentarily shutdown popular services while maintenance, updates, or repairs are undertaken. For instance, in an online game, such as Fortnite, the game goes down and users are unable to play. This is potentially thousands of users were would normally be playing this game with nothing to do while the servers are down. Accordingly, the in-content challenge platform 105 can target these users to play another game to generate drive the users who would have been playing the online game that is down to another game until the servers come back up.

Additionally, since the in-content challenge platform 105 extends beyond the video game realm, the in-content challenges are an effective way to gamify non-game activities. For example, an in-content challenge may reward players for binge-watching a television series or for listening to a new album by a musical artist. Outside of the realm of entertainment, a challenge could encourage and track education, such as reading instructional e-books or reading the news each day. A business may use a non-video game/non-entertainment version of the in-content challenge platform 105 installed on a company computer to motivate and track employees in completing required or optional training videos or participating in healthy activities (e.g., standing up at least once per hour) or professional responsibilities (e.g., logging in to the user's computer or entering the business location on time).

The in-content challenge platform 105 also enables sponsors to specifically target promotions toward custom audiences. In addition to player characteristics such as age and geography, sponsors could offer a challenge promoting a video game similar to another video game already frequently enjoyed by the player. For example, sponsors could target their competitors' players. Thus, in-content challenge platform 105 can place targeted brand promotion in content (e.g., interactive media) and drive traffic to specific content by promoting prizes and tracking user progress and completion of in-content challenges that are beneficial to sponsors, content creators, and end users.

Example Computer System

Figure 5:
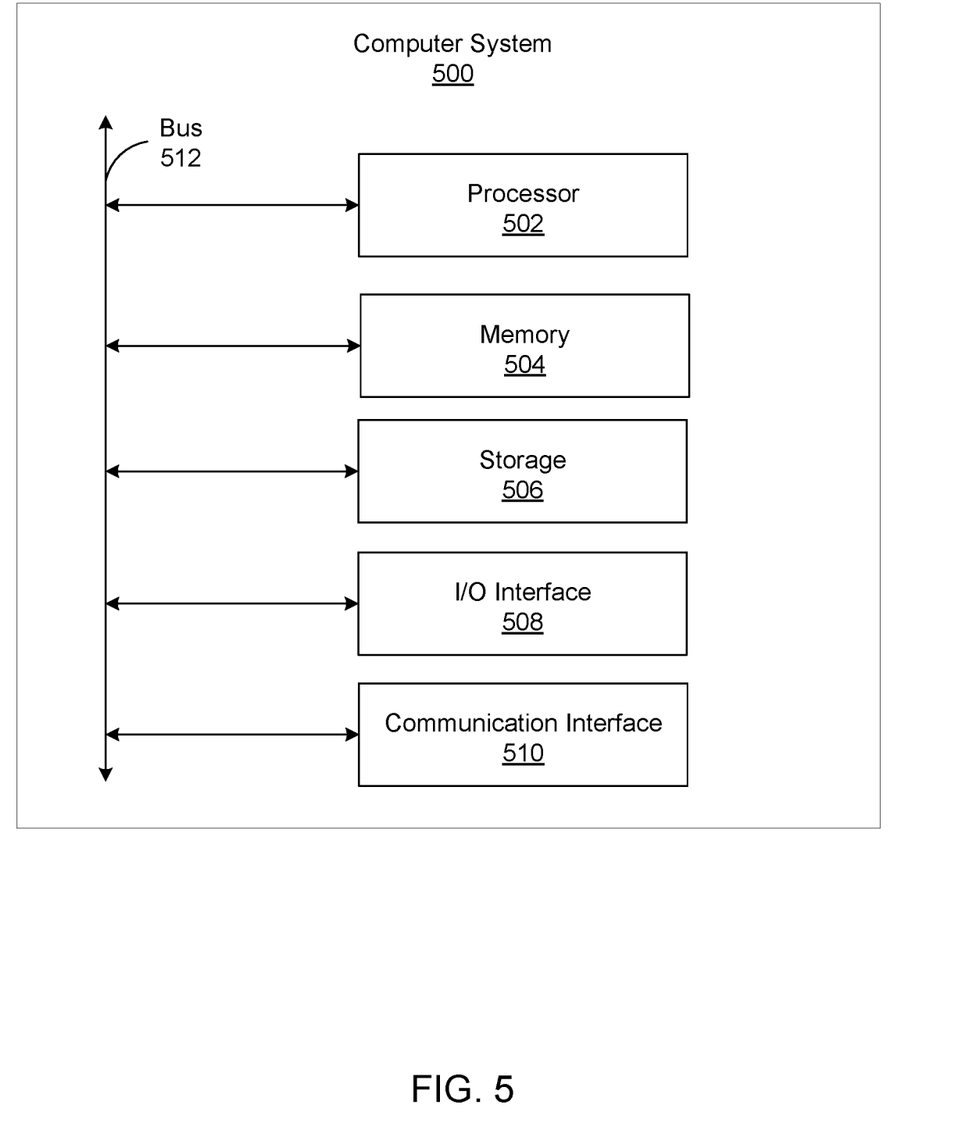
FIG. 5 shows an example computer system, in accordance with various embodiments.

FIG. 5 illustrates an example computer system, in accordance with one or more embodiments. Computer system 500 includes a processor 502, memory 504, storage 506, an input/output (I/O) interface 508, a communication interface 510, and a bus 512.

Processor 502 includes hardware for executing instructions, such as those making up a computer program. For example, to execute instructions, processor 502 may retrieve (or fetch) the instructions from an internal register, an internal cache, memory 504, or storage 506; decode and execute them; and then write one or more results to an internal register, an internal cache, memory 504, or storage 506. Processor 502 may include one or more internal caches for data, instructions, addresses, or any suitable number of internal caches.

Memory 504 includes main memory for storing instructions for processor 502 to execute or data for processor 502 to operate on. For example, computer system 500 may load instructions from storage 506 or another source to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results to the internal register or internal cache. Processor 502 may then write one or more of those results to memory 504. In some embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In some embodiments, one or more memory management units (MMUs) reside between processor 502 and memory 504 and facilitate accesses to memory 504 requested by processor 502. In some embodiments, memory 504 includes random access memory (RAM). This RAM may be volatile memory. This RAM may be dynamic RAM (DRAM) or static RAM (SRAM). Moreover, this RAM may be single-ported or multi-ported RAM.

Storage 506 includes mass storage for data or instructions. For example, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media. Storage 506 may be internal or external to computer system 500. In some embodiments, storage 506 is non-volatile, solid-state memory. In some embodiments, storage 506 includes read-only memory (ROM). This ROM may be mask-programmed ROM, programmable ROM (PROM), erasable PROM (EPROM), electrically erasable PROM (EEPROM), electrically alterable ROM (EAROM), or flash memory or a combination of two or more of these. Storage 506 may include one or more storage control units facilitating communication between processor 502 and storage 506.

I/O interface 508 includes hardware, software, or both providing one or more interfaces for communication between computer system 500 and one or more I/O devices. Computer system 500 may include one or more of these I/O devices. One or more of these I/O devices may enable communication between a person and computer system 500. For example, an I/O device may include a keyboard, keypad, game controller, microphone, monitor, mouse, printer, scanner, speaker, still camera, stylus, tablet, touch screen, trackball, video camera, another suitable I/O device or a combination of two or more of these. An I/O device may include one or more sensors. I/O interface 508 may include one or more device or software drivers enabling processor 502 to drive one or more of these I/O devices.

Communication interface 510 includes hardware, software, or both providing one or more interfaces for communication (such as, for example, packet-based communication) between computer system 500 and one or more other computer systems 500 or one or more networks. For example, communication interface 510 may include a network interface controller (NIC) or network adapter for communicating with an Ethernet or other wire-based network or a wireless NIC (WNIC) or wireless adapter for communicating with a wireless network, such as a WI-FI network. For example, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks. Communication interface 510 may include one or more communication interfaces 510.

Bus 512 includes hardware, software, or both coupling components of computer system 500 to each other. For example, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512.

A computer-readable storage medium encompasses one or more non-transitory, tangible computer-readable storage media possessing structure. For example, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these. A computer-readable non-transitory storage medium may be volatile, non-volatile, or a combination of volatile and non-volatile.

In some embodiments, a computer-readable storage medium implements one or more portions of processor 502 (such as, for example, one or more internal registers or caches), one or more portions of memory 504, one or more portions of storage 506, or a combination of these. In some embodiments, a computer-readable storage medium implements RAM or ROM. In some embodiments, a computer-readable storage medium implements volatile or persistent memory. In some embodiments, one or more computer-readable storage media embody software. Software may encompass one or more applications, bytecode, one or more computer programs, one or more executables, one or more instructions, logic, machine code, one or more scripts, or source code, and vice versa. In some embodiments, software includes one or more application programming interfaces (APIs). In some embodiments, software is expressed as source code or object code. In some embodiments, software is expressed in a higher-level programming language, such as, for example, C, Perl, or a suitable extension thereof. In some embodiments, software is expressed in a lower-level programming language, such as assembly language (or machine code). In some embodiments, software is expressed in JAVA. In some embodiments, software is expressed in Hyper Text Markup Language (HTML), Extensible Markup Language (XML), or other suitable markup language. In some embodiments, software is expressed in ruby-on-rails, Node.js, Python, Scala, or Unity.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
providing, by an in-content challenge platform, a client application of the in-content challenge platform to a user for installation on a client device of the user, the client application allowing the user to access a plurality of in-content challenges, each in-content challenge provided by the in-content challenge platform in connection with an instance of content provided by a third-party content provider computing system;
receiving, by the in-content challenge platform via the client application, an indication that the user initiated a session to consume an instance of content, the instance of content being associated with a content type, wherein the instance of content is a multiplayer video game played over a network via the client device with other users;
responsive to receiving the indication that the user initiated the session to consume the instance of content, causing an icon to be displayed in an overlay layer over the multiplayer video game;
responsive to receiving a user selection of the icon, determining, by the in-content challenge platform, a plurality of available in-content challenges based on the content type of the instance of content and characteristics of the user matching an in-content challenge criteria associated with each in-content challenge, each in-content challenge corresponding to engagement of the user with the instance of content, wherein the plurality of available in-content challenges are determined in response to receiving a user selection of the icon, wherein the icon is displayed in the overlay layer over the multiplayer video game while the user is in a game lobby waiting for other users to join a live match of the multiplayer video game;
providing, by the in-content challenge platform via the client application, the plurality of available in-content challenges for display to the user in an overlay menu on the client device over the instance of content;
responsive to receiving a selection from the user of an available in-content challenge, initiating the available in-content challenge, the available in-content challenge including a win condition that can be achieved by engagement of the user with the instance of content and a prize for at least meeting the win condition; and
responsive to determining that the user meets the win condition, providing the user with the prize associated with the win condition.

2. The method of claim 1, further comprising:
providing, by the in-content challenge platform via the client application, user progress toward the win condition in a display layer over the instance of content.

3. The method of claim 1, wherein the user is a registered user of the in-content challenge platform with a user profile at the in-content challenge platform and, wherein at least one of the other users playing the multiplayer video game are not registered users of the in-content challenge platform.

4. The method of claim 3, wherein at least one additional user registered with the in-content challenge platform is playing the multiplayer video game with the user, and wherein the prize associated with the win condition for the user is different relative to the at least one additional user based at least in part on availability of the prize at a location of the user relative to the at least one additional user.

5. The method of claim 1, further comprising:
receiving, by the in-content challenge platform, in-content challenge criteria from a plurality of sponsor computing systems to generate the plurality of in-content challenges; and
generating, by the in-content challenge platform, the plurality of in-content challenges.

6. The method of claim 1, wherein the third-party content provider computing system providing the instance of content is a game developer, a media service provider, an application developer, video production company, or an individual user.

7. The method of claim 1, further comprising:
receiving, by the in-content challenge platform, a registration request from the user to register with the in-content challenge platform and to perform in-content challenges; and
generating, by the in-content challenge platform, a user profile for the user.

8. The method of claim 1, wherein the user and a second user playing the multiplayer video game are registered users of an in-content challenge platform, wherein the user is located in a first location and the second user is located in a second location different from the first location, and wherein the user and the second user are simultaneously playing a same in-game challenge from different locations.

9. The method of claim 8, further comprising:
determining the prize associated with the win condition for the user based on the first location of the user; and
determining a second prize associated with the win condition for the second user based on the second location of the user, wherein the prize and the second prize are different.

10. The method of claim 9, wherein the prize at the first location is not available at the second location of the second user.

11. A non-transitory computer-readable storage medium comprising instructions that, when executed by a processor, cause the processor to:
receive, via a client application installed on a client device of a user, an indication that the user initiated a session to play a multiplayer video game with a plurality of other users over a network via the client device;
responsive to receiving the indication that the user initiated the session to play the multiplayer video game, cause an icon to be displayed in an overlay layer over the multiplayer video game;
responsive to receiving a user selection of the icon, determine a plurality of available in-game challenges based on the multiplayer video game and characteristics of the user matching an in-game challenge criteria associated with each in-game challenge, each in-game challenge corresponding to in-game achievements of the user within the multiplayer video game, wherein the plurality of available in-game challenges are determined in response to receiving a user selection of the icon, wherein the icon is displayed in the overlay layer over the multiplayer video game while the user is in a game lobby waiting for other users to join a live match of the multiplayer video game;
provide, via the client application, the plurality of available in-game challenges for display to the user on the client device;
responsive to receiving a selection from the user of an available in-game challenge, initiate the available in-game challenge, the available in-game challenge including a win condition that can be achieved by the user playing the multiplayer video game and a prize for at least meeting the win condition; and
responsive to determining that the user meets the win condition, provide the user with the prize associated with the win condition.

12. The non-transitory computer-readable storage medium of claim 11, wherein the instructions that, when executed by the processor, further cause the processor to:
provide, via the client application, user progress toward the win condition in a display layer over the multiplayer video game.

13. The non-transitory computer-readable storage medium of claim 11, wherein the instructions that, when executed by the processor, further cause the processor to:
receive in-game challenge criteria from a plurality of sponsor computing systems to generate the plurality of available in-game challenges; and
generate the plurality of available in-game challenges.

14. The non-transitory computer-readable storage medium of claim 11, wherein the user and a second user playing the multiplayer video game over the network are registered users of an in-content challenge platform, wherein the user is located in a first location and the second user is located in a second location different from the first location, and wherein the user and the second user are simultaneously playing a same in-game challenge from different locations.

15. The non-transitory computer-readable storage medium of claim 14, wherein the instructions that, when executed by the processor, further cause the processor to:
determine the prize associated with the available in-game challenge for the user based on the first location of the user; and
determine a second prize associated with the available in-game challenge for the second user based on the second location of the user, wherein the prize and the second prize are different.

16. The non-transitory computer-readable storage medium of claim 15, wherein the prize at the first location is not available at the second location of the second user.

17. A computer system comprising:
a processor; and
a non-transitory computer-readable storage medium comprising instructions that, when executed by the processor, cause the processor to:
receive, via a client application installed on a client device of a user, an indication that the user initiated a session to play a multiplayer video game with a plurality of other users over a network;
responsive to receiving the indication that the user initiated the session to play the multiplayer video game, cause an icon to be displayed in an overlay layer over the multiplayer video game;

responsive to receiving a user selection of the icon, determine a plurality of available in-game challenges based on the multiplayer video game and characteristics of the user matching an in-game challenge criteria associated with each in-game challenge, each in-game challenge corresponding to in-game achievements of the user within the multiplayer video game, wherein the plurality of available in-game challenges are determined in response to receiving a user selection of the icon, wherein the icon is displayed in the overlay layer over the multiplayer video game while the user is in a game lobby waiting for other users to join a live match of the multiplayer video game;

provide, via the client application, the plurality of available in-game challenges for display to the user on the client device;

responsive to receiving a selection from the user of an available in-game challenge, initiate the available in-game challenge, the available in-game challenge including a win condition that can be achieved by the user playing the multiplayer video game and a prize for at least meeting the win condition; and responsive to determining that the user meets the win condition, provide the user with the prize associated with the win condition.

18. The computer system of claim 17, wherein the user and a second user playing the multiplayer video game over the network are registered users of an in-content challenge platform, wherein the user is located in a first location and the second user is located in a second location different from the first location, and wherein the user and the second user are simultaneously playing a same in-game challenge from different locations.

19. The computer system of claim 18, wherein the instructions that, when executed by the processor, further cause the processor to:

determine the prize associated with the available in-game challenge for the user based on the first location of the user; and determine a second prize associated with the available in-game challenge for the second user based on the second location of the user, wherein the prize and the second prize are different.

20. The computer system of claim 19, wherein the prize at the first location is not available at the second location of the second user.

* * * * *